(12) United States Patent
Ockenfuss

(10) Patent No.: US 7,429,111 B2
(45) Date of Patent: Sep. 30, 2008

(54) TWO-PANEL COLOR MANAGEMENT SYSTEM

(75) Inventor: Georg J. Ockenfuss, Santa Rosa, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 406 days.

(21) Appl. No.: 11/288,568

(22) Filed: Nov. 29, 2005

(65) Prior Publication Data

US 2006/0119797 A1 Jun. 8, 2006

Related U.S. Application Data

(60) Provisional application No. 60/633,501, filed on Dec. 6, 2004.

(51) Int. Cl.
| | |
|---|---|
| G03B 21/14 | (2006.01) |
| G03B 21/28 | (2006.01) |
| G02B 1/10 | (2006.01) |
| G02B 5/30 | (2006.01) |
| G02B 27/14 | (2006.01) |
| H01S 3/00 | (2006.01) |
| G09G 5/00 | (2006.01) |
| F21V 7/04 | (2006.01) |
| G02F 1/1335 | (2006.01) |
| G02F 1/00 | (2006.01) |
| C09K 19/02 | (2006.01) |

(52) U.S. Cl. ................ 353/20; 353/33; 353/84; 353/81; 353/82; 359/583; 359/490; 359/831; 359/634; 359/349; 345/3.1; 345/87; 362/561; 349/5; 349/182; 349/193; 349/194; 348/751; 348/761; 348/766; 348/790

(58) Field of Classification Search ............ 353/20, 353/33, 8, 30, 84, 81, 82; 359/583, 490, 359/831, 634, 349; 345/3.1, 87; 362/561; 349/5, 182, 193, 194; 348/751, 761, 766, 348/790

See application file for complete search history.

(56) References Cited

U.S. PATENT DOCUMENTS

| 5,517,340 A | 5/1996 | Doany et al. .............. 349/5 |
| 5,863,125 A | 1/1999 | Doany .................. 353/84 |
| 6,280,034 B1 | 8/2001 | Brennesholtz ........... 353/20 |
| 6,388,718 B1 | 5/2002 | Yoo et al. ............... 349/9 |
| 6,568,815 B2 | 5/2003 | Yano et al. .............. 353/84 |
| 6,650,377 B2 | 11/2003 | Robinson et al. .......... 349/9 |
| 6,702,446 B2 | 3/2004 | De Vaan et al. ........... 353/84 |
| 6,707,516 B1 | 3/2004 | Johnson et al. .......... 349/78 |

*Primary Examiner*—Diane I. Lee
*Assistant Examiner*—Magda Cruz
(74) *Attorney, Agent, or Firm*—Allen, Dyer, Doppelt, Milbrath & Gilchrist, P.A.

(57) ABSTRACT

The invention provides a two-panel color management system for projection display applications, wherein color sequencing is accomplished using achromatic beam switching and static color separation. In a preferred embodiment, a liquid-crystal polarization switch alternates a polarization of an input light beam between two orthogonal states. A polarization beam splitter directs the beam comprising three primary color components alternately along a first and second paths, wherein first and second different secondary color filters are disposed for forming first and second secondary colored beams, each having two different primary color components. A dichroic color separator alternately receives the first and second secondary colored beams, separates their primary color components and directs them to first and second imager panels. A beam combiner combines the first polarized primary color beam from the first imager and the second polarized primary color beam from the second imager to form a projection beam.

21 Claims, 4 Drawing Sheets

TWO-PANEL COLOR MANAGEMENT SYSTEM

CROSS-REFERENCE TO RELATED APPLICATIONS

The present invention claims priority from U.S. Provisional Patent Application No. 60/633,501 filed Dec. 6, 2004, entitled "2-Panel Light Engine for Projection Display Using LC-Polarization Switch", which is incorporated herein by reference for all purposes.

TECHNICAL FIELD

The present invention relates to a color projection display system, and in particularly to a color display system using multiple imager panels and achromatic polarization switching for color management.

BACKGROUND OF THE INVENTION

Optical imaging systems typically include a transmissive or a reflective imaging panel, also referred to as a light valve or light valve array, which imposes an image on a light beam. Transmissive imaging panels are typically translucent and allow light to pass through. Reflective imaging panels, on the other hand, reflect only selected portions of the input beam to form an image. Reflective imaging panels, such as liquid-crystal-on-silicon (LCoS) microdisplays, provide some advantages, as controlling circuitry may be placed behind the reflective surface and more advanced integrated circuit technology becomes available when the substrate materials are not limited by their opaqueness.

LCoS-based imaging panels, as well as other type of liquid crystal display (LCD) based imaging panels, rotate the polarization of incident light. Typically, polarized light is either reflected by the imaging panel with its polarization state substantially unmodified for the darkest state, or with a degree of polarization rotation imparted to provide a desired grey scale. A 90° rotation provides the brightest state in these systems. Accordingly, a polarized light beam is generally used as the input beam for reflective LCD imagers.

Projection display systems based on the LCD technology commonly employ one, two, or three LCD imaging panels in order to create a full color projected image. When three panels are used, each panel is illuminated with one of the three primary colors. Each panel is electronically addressed with video data corresponding to the color channel for the illuminating light received at that imager. Finally these three monochrome images are projected onto the screen simultaneously, resulting in a high brightness image that has no artifacts associated with temporal color sequencing of the image data.

In one panel systems, such as those disclosed in U.S. Pat. No. 6,702,446 issued Mar. 9, 2004 to De Vaan et al, and U.S. Pat. No. 6,707,516 issued Mar. 16, 2004 to Johnson et al, some means of illuminating the single imager sequentially with all three primary colors is employed, typically either color-sequencing or scrolling a pattern of three primary-colored stripes of light across the imager, e.g. using a color wheel, to create a full color image. The imager is electronically addressed with a time-sequential (and possibly scrolling) video image data stream that modulates in synchrony with the time-(and possibly space-) varying multi-color illumination source.

An imaging system projects a magnified image of this color-sequential (or color scrolling) picture onto a viewing surface where the viewer perceives a full-color image as a result of the human eye's slower response time compared with the rate of color modulation in the imaging system. Due to the color-sequential nature of the one-panel display, a lower-brightness image results as compared with three-panel displays. The image may also include color-breakup artifacts due to the temporal nature of the color sequencing system.

A two-panel architecture is an attractive compromise between these two extremes. Typically, color management in a two-panel architecture falls in one of several generals schemes. In a first scheme, light from the illumination source is divided into two beams by splitting the raw light into its two constituent, orthogonal polarization states, forming to continuous, i.e. non-modulated, polarized beams. Each of these beams is routed to one of the two imagers. These two polarized beams are color filtered and modulated with color sequencing or color scrolling means, e.g. a color wheel, similar to systems having only a single imager.

The two resulting color-modulated images are recombined using a polarization beam combiner to create a single color-sequential full-color image. The benefit of this approach compared to a one-panel system is a brighter image than that obtained using only one imager. However this system is still not as bright as a three-panel system since some form of temporal color sequencing is still needed.

In a second scheme disclosed in U.S. Pat. No. 6,280,034 issued Aug. 28, 2001 to Brennesholtz, and U.S. Pat. No. 6,388,718 issued May 14, 2002 to Yoo et al, light from the source is first spectrally divided into two beams such that one of the beams consists of light from a single primary color channel (for instance only red light) and the second beam consists of light from the remaining two primary color channels (green and blue light, for example). Light from the first beam is routed to one of the panels so that this panel continuously receives one primary illumination color and displays image data corresponding to this one primary color. The second beam, consisting of light from the two remaining primary colors, is directed to the second imaging panel. Dynamic color sequencing or color scrolling means are used to temporally sequence the two primary colors of the second beam onto the imaging panel.

The imaging panel is electronically addressed with a time-sequential video image data stream that modulates in synchrony with the time-varying (and possibly space-varying, e.g. scrolling) two-color illumination source.

The images from the two imaging panels are optically combined using a dichroic beam-combining element and are projected onto a screen or viewing surface to create a full-color image. This system may optionally include a polarization recovery subsystem in the illumination subsystem to increase overall display brightness. Nevertheless, the resulting image is less bright than a full three-panel system due to the temporal color sequencing in the two-color imager. However, it is typically brighter than a one panel system because it is capable of simultaneously projecting two overlapping, full-frame color images, whereas the single panel system only displays one full-frame color image at any instant in time.

All of these prior-art two-panel projection systems require dynamic color-separating means, typically either mechanical or electrical color shutters, to provide the color sequencing upon one of the imaging panels. Among them, mechanical color wheels are currently most widely used. For example, U.S. Pat. No. 5,517,340 issued May 14, 1996 to Doany et al, and U.S. Pat. No. 5,863,125 issued Jan. 26, 1999 to Doany disclose two-panel schemes in which color wheels are used to sequentially provide one of the primary colors to a polarization beam splitting cube for projection. The color wheels as means of dynamic color separation have however some disadvantages, such as a fixed color ratio that complicates white balance adjustment, relatively large size and cost, and mechanical wear.

U.S. Pat. No. 6,568,815 issued May 27, 2003 to Yano et al, and U.S. Pat. No. 6,650,377 issued Nov. 18, 2003 to Robinson et al disclose dual-panel systems which use color-selective dynamic polarization control of the illuminating light beam for color sequencing. These two-panel projection systems include an input color-selective polarization modulator, or switch, to first dynamically rotate the polarization of one color component differently than the polarization of a second color component of the beam, and then use polarization beam splitters to control which primary and or secondary colors are provided to the panels. These dynamic color-selective polarization switches, which are embodied as a retardance-based polarization stack filter that comprises a stack of birefringent layers and at least one active liquid crystal cell, also have certain disadvantages; they don't have sharp transitions from one color-band to the next, and may be difficult to fabricate using standard technological processes, and can therefore be relatively expensive.

An object of the present invention is to overcome the shortcomings of the prior art by providing a two-panel LCD system, which employs dynamic achromatic polarization switching and static color separation for providing temporal color sequencing.

Another object of the present invention is to provide a two-panel LCD system using a simple input LC polarization switch and static color separators, in which both of the imaging panels are time-shared between two colors.

SUMMARY OF THE INVENTION

In accordance with the invention, a color management system is provided, comprising: switching means for achromatically switching a light beam to alternate between a first path and a second path, wherein the light beam comprises first, second and third different color components; first color separating means disposed in the first path for separating off the third color component, and for directing the first color component and the second color component along separate paths; second color separating and routing means disposed in the second path for separating off the second color component, and for directing the first color component and the third color component along separate paths; a first imager for spatially modulating at least the first color components, and for outputting a first spatially modulated colored beam with a single color component or alternating color components; a second imager for spatially modulating two of the first, second and third color components, and for outputting a second spatially modulated colored beam having alternating color components, whereby the first and second spatially modulated colored beams together include all three color components; a beam combiner for combining the first spatially modulated colored beam with the second spatially modulated colored beam to form a projection beam.

In accordance with another aspect of this invention, the switching means comprises a polarization switch for achromatically switching a polarization of the light beam to alternate between first and second polarization states, and a polarizing beam splitter for directing the light beam along the first path when the light beam has the first polarization state, and for directing the light beam along the second path when the light beam has the second polarization state.

In accordance with another aspect of this invention, the first color separating and routing means includes a first chromatic filter for substantially removing the third primary color component from the beam of light, and for outputting a first secondary colored beam comprising first and second primary color components, and the second color separating and routing means includes a second chromatic filter for substantially removing the second primary color component from the beam of light, and for outputting a second secondary colored beam comprising the first and third primary color components, and wherein the first and second color separating means further comprise a common chromatic beam splitter disposed to alternately receive the first and second secondary colored beams, for splitting each of said first and second secondary colored beams into two primary colored beams, and for directing each of said two primary colored beams to a different one of the first and second imagers.

BRIEF DESCRIPTION OF THE DRAWINGS

The invention will be described in greater detail with reference to the accompanying drawings which represent preferred embodiments thereof, wherein.

DETAILED DESCRIPTION

The color system used herein will be the additive color system unless otherwise indicated, including indication by contextual use. In the additive color system, red, blue, and green are the primary colors, and magenta (red+blue), cyan (blue+green) and yellow (red+green) are the secondary colors. Those of skill in the art appreciate that magenta, cyan, and yellow are referred to as primary colors in the subtractive color system, which is often used in describing printing systems, for example.

Figure 1:
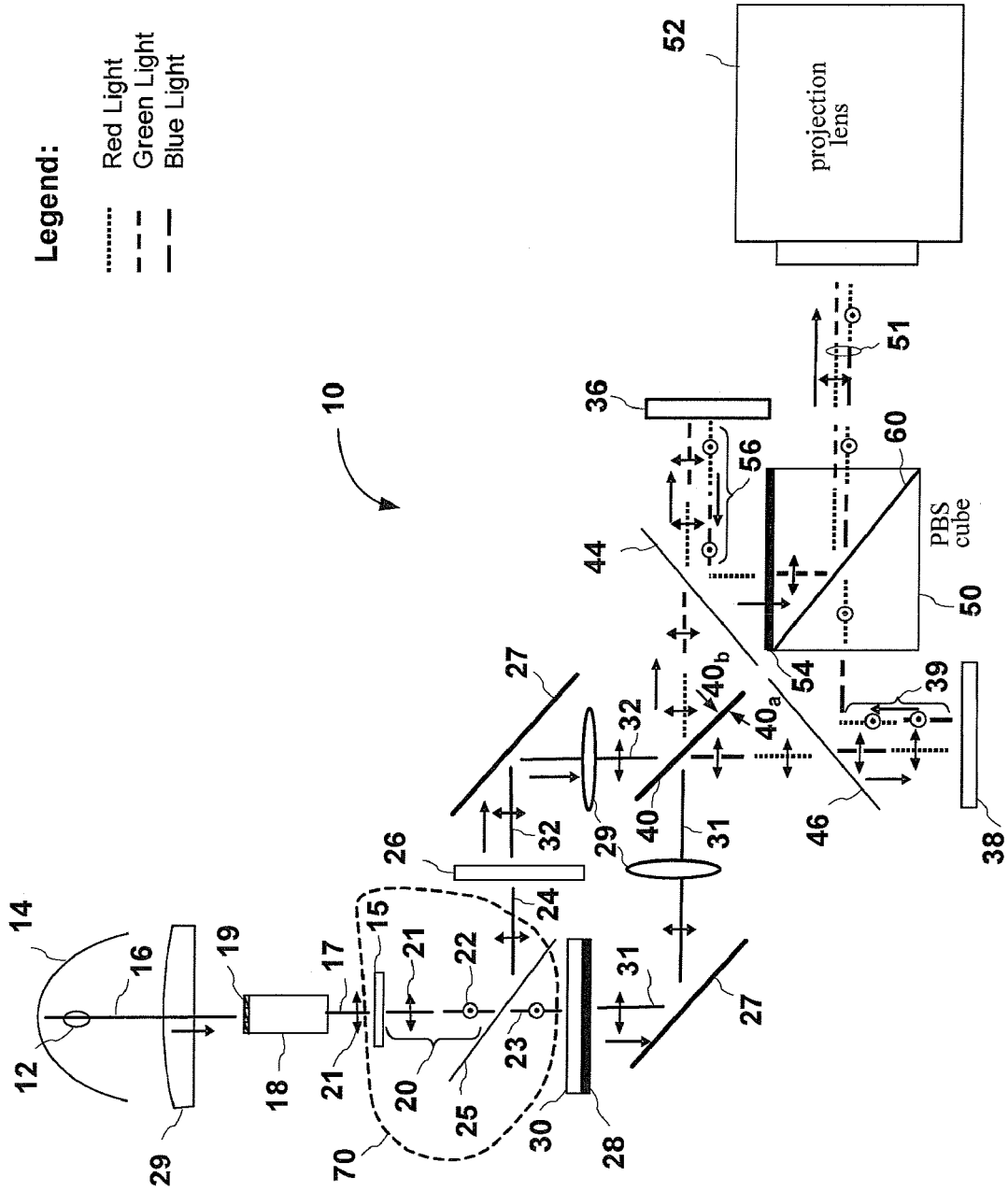
FIG. 1 is a diagram of the color management system of the present invention.
Figure 2:
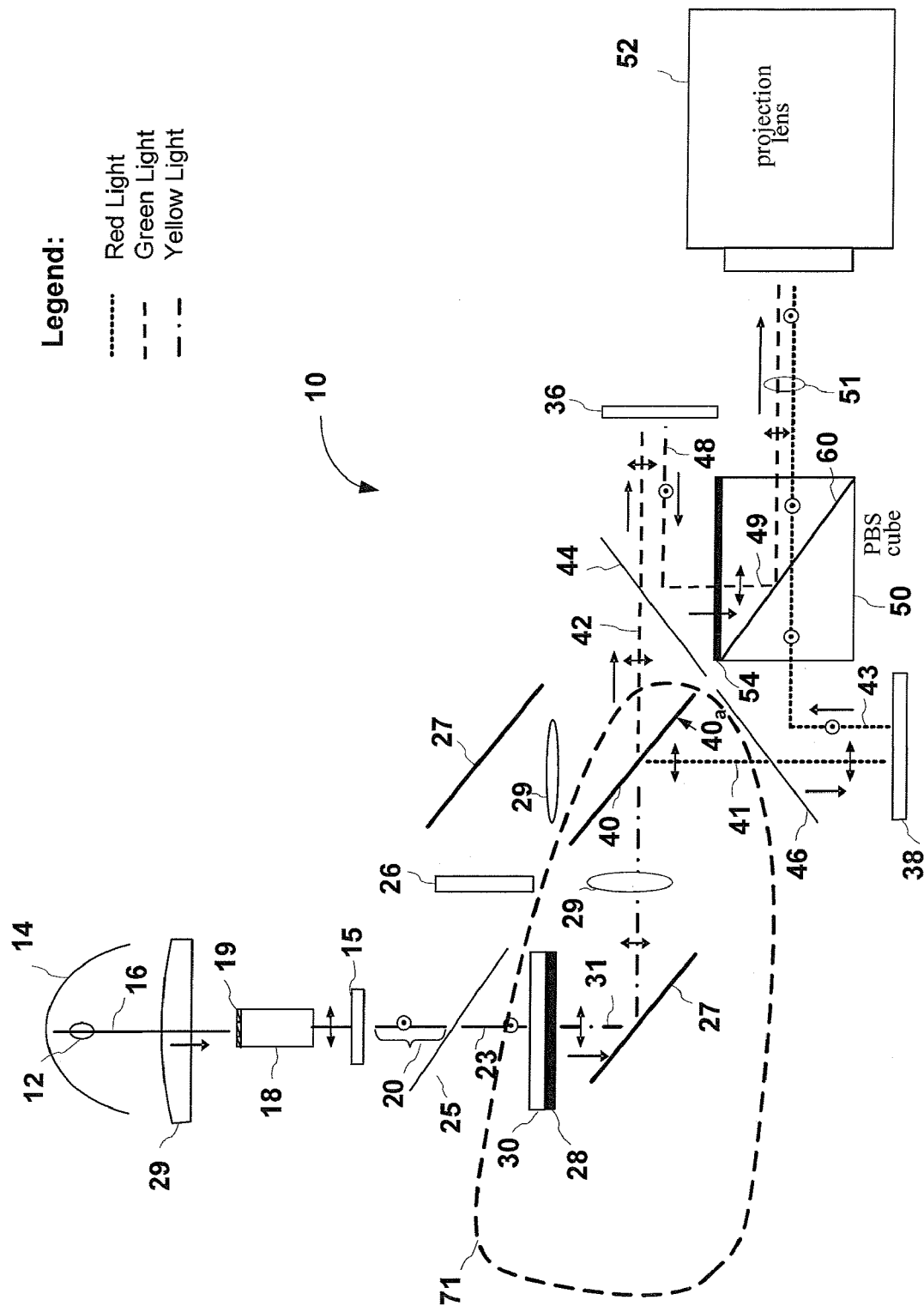
FIG. 2 is a diagram illustrating beam and color routing in a first mode of operation of the color management system shown in FIG. 1.
Figure 3:
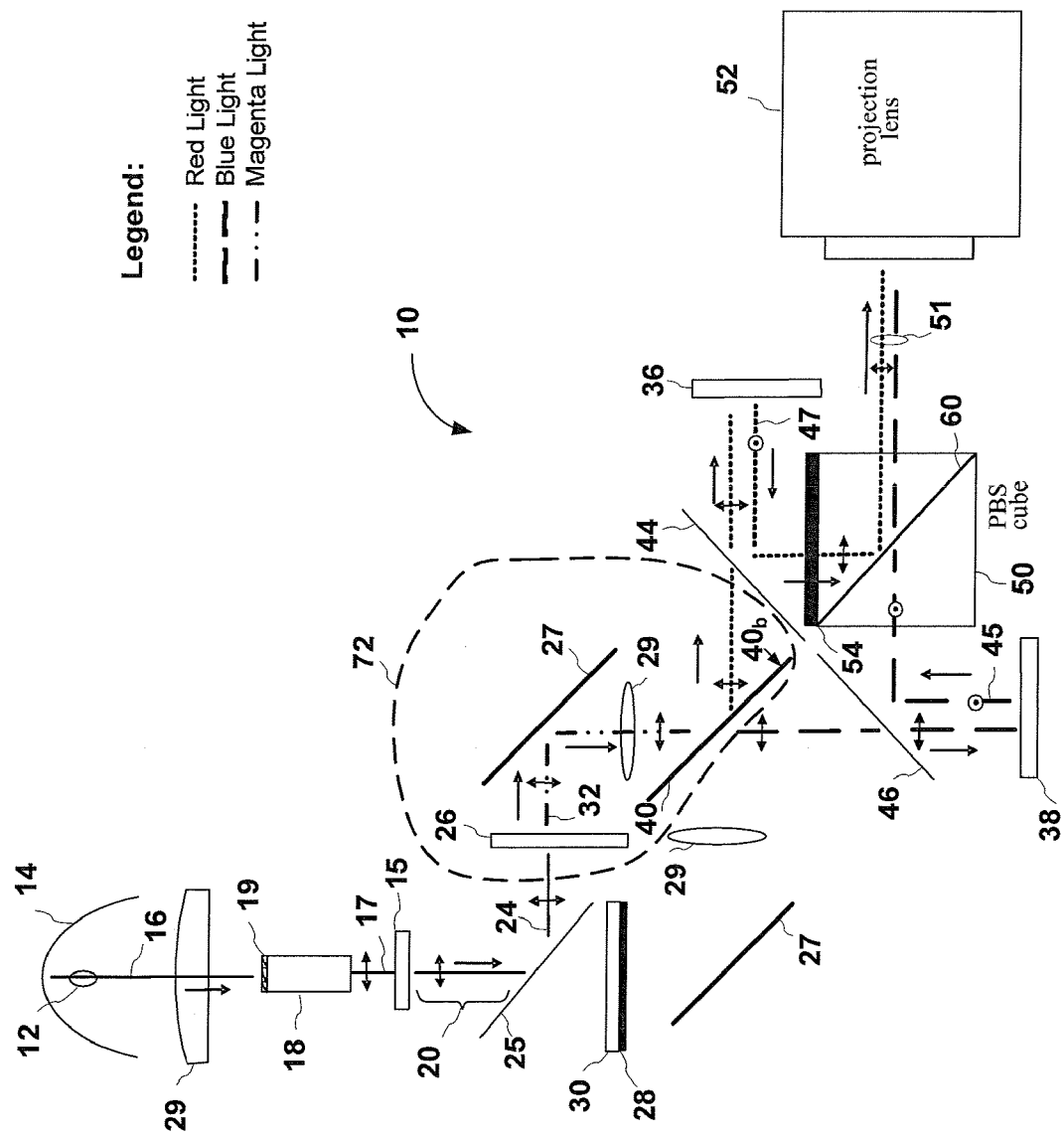
FIG. 3 is a diagram illustrating beam and color routing in a second mode of operation of the color management system shown in FIG. 1.

An exemplary embodiment of a two-panel color management system, which combines dynamic achromatic polarization switching with static spatial color separation for color sequencing, is shown in FIGS. 1-3 and is hereafter described.

Turning first to FIG. 1, the two-panel color-management system 10 includes a light source in the form of a lamp 12 with an arc 14, which in operation produces a beam of essentially white light 16 having more than one polarization state, e.g. unpolarized. Alternatively, the lamp 12 can be a filament-based lamp. A light integrating light pipe 18, with a first polarization converter 19 at the input end thereof, is used to create a polarized, homogenized illumination beam 17, from the unpolarized beam 16. In other words, the polarized beam 17 has been converted to essentially a single polarization state, as indicated by the double-ended arrow 21, which designates a "p-type" polarization state. The p-type polarization state is arbitrarily chosen for purposes of discussion, and those of skill in the art appreciate that the p-type polarization, and an orthogonal thereto "s-type" polarization, is defined in reference to a selected plane, and the s-type state is chosen in alternative embodiments, with suitable modification of polarization-sensitive blocks and elements shown in FIGS. 1-3, as would be known to those skilled in the art.

Preferably, the polarization converter 19 is comprised of a plurality of corner-cube-type polarization converters, e.g. polarizing beamsplitter cubes, on the input end of the light pipe 18. In an alternate embodiment, the lamp 12 is a polarizing lamp providing a light beam having essentially a single polarization state, and the polarization converter 19 is not required. Optionally, a relay lens 29 can be used after the lamp 12 to provide a compact optical path.

A clean-up polarizer, not shown, can be optionally disposed at the output end of the light pipe 18 to remove light not having the selected polarized state. After the polarization converter 19 converts the light 17 from the lamp 12 to the selected polarization state, reflections off the walls of the light pipe 18 rotate the polarization state of some of the light. The ratio of p-polarized to s-polarized light exiting the light pipe 18 is typically about between 3:1 and 5:1. A reflective polarizer, such as a wire-grid-type polarizer, is generally preferred as the clean-up polarizer if the light flux is such that an absorptive polarizer would generate too much heat. If the light exiting the light pipe 18 is highly polarized, an absorptive clean-up polarizer is alternatively used, or may be omitted entirely in some embodiments. In yet other embodiments, corner-cube, e.g. MacNielle-type polarizer, or frustrated total-internal-reflection (FTIR)-type polarizer is used as the clean-up polarizer, with appropriate adjustment of the illustrated light path(s).

As would be obvious to one skilled in the art, the lamp 12, the polarization converter 19, and the light integrating pipe 18 can be substituted with an alternative source of the polarized beam 17 of substantially white light, and used in the color management system of the present invention. The polarized beam 17, which is also referred to in this specification as the input beam or the illuminating beam, is a beam of substantially white light and as such, it includes at least three color components, which together are capable of producing a substantially white light, and which will be referred to herein as a first, second and third color components. In the embodiments described hereinafter, these three color components are the primary color components, i.e. red, green and blue. By way of example only, in the following description the first, second and third color components will be associated with the red, green and blue colors, respectively. However, this particular association is chosen only for convenience of the description, and other color associations for the first, second and third color components are equally possible within the scope of the invention. For example, in alternative embodiments the first color component can be blue, the second—green, and the third—red, etc.

A polarization modulator 15, also referred to herein as the polarization switch 15, is disposed to receive the polarized beam 17 comprising the three color components. The polarization modulator 15 operates to alternately switch the polarization of the beam 17 between two different, preferably orthogonal, polarization states, e.g. the "p" and "s" polarization states, to form a polarization-switched beam 20. The polarization modulator 15 is preferably embodied as an electrically controlled LC switch, for example a ferroelectric LC (FELC) switch, which is commercially available from e.g. Displaytech, Inc. By way of example, the electrically controlled LC polarization switch 15, when in an "OFF" state, rotates the polarization of the input beam 17 by 90 degrees from the p-state to the orthogonal thereto s-state, and in an "ON" state transmits the p-polarized beam 17 without changing its polarization. In other embodiments, the OFF and ON state designations can be reversed. In operation, the LC switch 15 is alternately switched between the "OFF" state, which is maintained for a duration of a first time interval $T_1$, and the "ON" state, in which it is maintained for a duration of a second time interval $T_2$, so that the polarization-switched beam 20 is formed as the output of the switch 15. The two alternating states of polarization of the beam 20 of duration $T_1$ and $T_2$ are schematically represented in FIG. 1 by two line segments marked with a concentric circle 22 indicating the s-polarization, and the double arrow 21 indicating the p-polarization, respectively. When considered in reference to a time scale including multiples of $(T_1+T_2)$, the polarization-switched light beam 20 will also be referred to herein as the alternately polarized beam 20; in the context of this specification, the words "alternately polarized beam", or "alternately polarized color component", mean a light beam having a polarization which alternates in time between a first polarization state, e.g. the p-state, and a second polarization state preferably orthogonal to the first state, e.g. the s-state.

A first polarization beam splitter (PBS) 25, in the form of a wire grid (WG) polarizer positioned at an acute angle, e.g. at 45°, to the beam 20, is disposed to receive the alternately polarized beam 20 for spatially separating the "s" and "p" polarizations. More particularly, the beam 20 is transmitted through the WG polarizer 25 when the beam is s-polarized, and is reflected from the WG polarizer 25 when the beam is p-polarized, so that the beam 20 is directed by the WG polarizer 25 along a first path 23 during the time interval $T_1$, and along a second path 24 during the time interval $T_2$. In other embodiments, a different type of PBS, e.g. a cube, or a FTIR-type, can be used in place of the WG polarizer 25. The polarization modulator 15 and the PBS 25 together form beam switching means 70 for achromatically switching the light beam 17 to alternate between the first path 23 and the second path 24.

Following the PBS 25, a first chromatic filter 30 and a second different chromatic filter 26 are disposed in the first and second paths 23 and 24, respectively, for alternately receiving the beam 20 in dependence on the polarization thereof. The first and second chromatic filters 30 and 26 will also be referred to hereinafter as the first and second secondary color filters, or as the first and second color filters.

Importantly, both the polarization modulator 15 and the PBS 25 are substantially achromatic, i.e. they perform their respective functions substantially preserving the three primary color components of the input beam 17, so that in operation both the first 30 and second 26 chromatic filters alternately receive light that comprises all three color components, i.e. blue, green, and red, and output light of differing composite, or secondary, colors. One skilled in the art would appreciate that the PBS 25 may have a spectral transfer function which is not entirely flat across the visible spectrum range, and the polarization modulator 15 may have a spectral transfer function which somewhat differs in shape for the "ON" and "OFF" states thereof, and therefore relative intensities of the three primary color components received by the filters 26, 30 may be somewhat different, without changing the substantially achromatic character of the beam switching means 70 formed by the modulator 15 and the PBS 25, as long as each of the filters 30, 26 receives substantial amount of each of the three primary color components. In other embodiments, alternative beam switching means for achromatically switching the light beam 17 to alternate between two optical paths can be used instead of the combination of the polarization modulator 15 and the PBS 25, e.g. having the functionality of a directional 1×2 optical beam switch.

The first chromatic filter 30 and second chromatic filter 26 are different secondary color filters, which separate off a differing primary color component from incident light, and output a first and second secondary colored beams. They form a first stage of first and second, respectively, static color separating means of the dynamic color management system of the present invention, each of said first and second color separating means functioning to separate off one of the three color components, and to direct the other two color components along separate paths. In the shown embodiment, a second stage of said first and second color separating means includes a common static chromatic beam splitter 40, which alternately receives the first and second secondary colored beams, separates remaining two primary color components of the received secondary-colored beam, and directs them along separate paths to a first and second imagers 38, 36 respectively, so that each of said two primary colored beams is directed to a different one of the first (38) and second (36) imagers, for imparting image information by spatial modulation. This color routing, which differs for the time periods $T_1$ and $T_2$, is illustrated in FIGS. 2 and 3 and will now be described more in detail, in conjunction with a description of the rest of the color management system of the present invention.

With reference to FIG. 2, a first temporal mode of operation of the color management system of the present invention corresponds to the time interval $T_1$, when the LC switch 15 is off, so that the beam 20 is s-polarized, and is transmitted through the PBS 25 along the first path 23 towards the first secondary color filter 30. In the embodiment shown in FIGS. 1-3, the first secondary color filter 30 is a yellow filter, which separates off, e.g. reflects, the third, e.g. blue, color component of the beam, said blue component being thereby removed and substantially lost, and outputs, e.g. transmits, a first colored beam 31 having substantially only the first, e.g. red, and the second, e.g. green, components, which together form the first secondary, in this particular case yellow, color of the colored beam 31. A polarization-rotating half-wave plate 28 rotates the polarization of the yellow beam 31 by 90°, thereby converting it back into the p polarization. In an alternative embodiment, the polarization converter 28 is disposed in the second optical path 24, e.g. after the filter 26, with suitable changes to the optical arrangement of other polarization-sensitive optical elements of the system 10, that would be obvious to one skilled in the art.

The static chromatic beam splitter 40, also referred to herein as the color separator 40, in the form of a transflective dichroic beamsplitter, is disposed to receive the yellow beam 31 at an acute angle via a side 40a thereof, for spatially separating the first and second primary color components of the yellow beam 31 to form two primary colored beams 41 and 42, and for directing each of said two primary colored beams 41, 42 to a different one of first (38) and second (36) imagers, e.g. for directing the first color component towards the first imager 38, and the second color component towards the second imager 36.

More particularly, in the embodiment described herein, the static color separator 40 is a red/cyan beamsplitter, which is configured to reflect the red component 41 of the p-polarized yellow beam 31, and to transmit the green component 42 thereof, the red and green color components represented in FIGS. 1-3 by dotted and dashed lines, respectively. These red and green components 41, 42 are thereby directed by the static dichroic beam splitter 40 towards the first 38 and second 36 imagers, respectively, which are preferably embodied as reflective LCoS imaging panels. In another embodiment, the first chromatic filter 30 can be a cyan filter, and the static color separator 40 can be a yellow/blue beam splitter for splitting cyan light received from the filter 30 into green and blue components, with the numerals 41, 42 in FIG. 2 referring in that embodiment to the green and blue components, respectively.

The first chromatic filter 30 and the color separator 40, together with the optional optical components 27, 28, 29 disposed therebetween, form the first color separating and routing means 71 of the color management system according to the embodiment of the present invention. In other embodiments, other static color separating and routing means can be disposed in the first path, which function to separate off the third color component, and to direct the first color component towards the first imager, and the second color component along a separate path towards the second imager.

Both the first and second primary color components, e.g. the red and green light, are p-polarized and therefore transmitted through reflective polarizers 46 and 44, respectively, positioned at acute angles, e.g. 45° to the propagation directions of the respective color components 41 and 42.

Preferably, the reflective polarizers 44 and 46 are wire-grid (WG) polarizers, but other high-quality reflective polarizers, such as corner-cube-type (MacNielle-type) or frustrated total-internal-reflection ("FTIR")-type polarizers can be used. Those skilled in the art understand that FTIR polarizers pass light having s-type polarization, and reflect light having p-type polarization, and that components and diagrams would be modified accordingly. The reflective polarizers 44 and 46 transmit light of one polarization state, in this example p-polarized light, and reflect light in the orthogonal polarization state, e.g. s-polarized light, and therefore will also be referred to hereinafter as the second and third polarizing beam splitters 46 and 44, respectively, or the second and third WG-PBS 46, 44. It is desirable that the second and third polarizing beam splitters 46 and 44 be of higher quality, i.e. sufficiently optically flat to preserve the quality of the image reflected off of the imager panels 36 and 38.

The LCoS imaging panels 36 and 38 spatially modulate light incident thereupon and rotate the polarization state of the reflected light by 90°. Thus, spatially modulated red light 43, which is reflected from the first imager 38, is s-polarized; this light 43 is then reflected off the reflective polarizer 46 associated with the first imager 38 towards a polarization beam splitting cube 50, which acts as a polarization beam combiner. Similarly, the second imager 36 outputs a second s-polarized spatially modulated green light 48, which is reflected off the reflective polarizer 44 towards a polarization beam combiner 50. The polarization beam combiner 50, in the form of a polarization beam splitter cube, combines it with the spatially modulated red light outputted from the first imager 38, to form a projection beam 51, said projection beam 51 during the time interval $T_1$ consisting substantially of the first and second color components, i.e. red and green in this particular embodiment.

In another embodiment, the first and second imagers 38, 36 are transmissive LC panels positioned in a reverse optical order with the second and third PBS 46 and 44, respectively, compared to the embodiment shown in FIGS. 1-3.

FIG. 3 illustrates functioning of the color routing scheme shown in FIG. 1 according to a second temporal mode of operation of the color management system of the present invention; this second mode corresponds to the time interval $T_2$, when the LC switch 15 is in the "ON" state.

During the time interval $T_2$, the achromatic LC switch 15 is switched on, the beam 20 is p-polarized, and is reflected off the PBS 25 along the second path 24 towards the second chromatic filter 26, which is a magenta filter in the shown embodiment. The magenta filter 26 separates off or removes, e.g. reflects, the second, e.g. green, color component of the beam 20, said green component being thereby substantially lost, and outputs, e.g. transmits, a second colored beam 32 having substantially only the first, e.g. red, and the third, e.g. blue, components, which together form the second secondary color, magenta in this embodiment, of the colored beam 32.

The second colored beam 32, suitably shaped by optional optical elements such as folding mirror 27 and relay lens 29, is directed to impinge on an opposite side 40b of the static red/cyan color separator 40 along an optical path shown in FIG. 3 by a dot-dashed line, for spatially separating the first and third color components of the magenta beam 32, so that the first, i.e. red, color component, which is again reflected by the red/cyan color separator 40, is now directed, in the form of a red-colored beam, towards the second imager 36, and the third, i.e. blue, color component in the form of a blue-colored beam—towards the first imager 38. The spatially separated red and blue color components are represented in FIGS. 1, 3 by dotted and long dashed lines, respectively.

The second chromatic filter 26 and the color separator 40, together with the optional optical components 27 and 29 disposed therebetween, form the second color separating means 72 of the color management system disposed in the second path 24 according to the embodiment of the present invention. In other embodiments, other static color separating means can be employed, which function to separate off the second color component, and to direct the first and third color component along different paths to a different one of the first and second imagers 38, 36, e.g. to direct the first color component towards the second imager 36, and the third color component towards the first imager 38,.

Both the blue and red light components of the second colored beam 32, being p-polarized, are transmitted through reflective polarizers 46 and 44, respectively, prior to impinging on the first and second imagers 38 and 36. The first imager 38 spatially modulates the incident thereon during the time period $T_2$ blue color component, and output spatially modulated s-polarized blue light 45 toward the WG-PBS 46, which reflects it further toward the polarization combiner 50. Similarly, the second imager 36 spatially modulate the incident thereon red color component during the time period $T_2$, and output spatially modulated s-polarized red light 47 toward the WG-PBS 44, for reflecting it further toward the polarization combiner 50. The polarization combiner 50 combines the spatially modulated blue light 45 received from the first imager 38 with the spatially modulated red light 47 converted to the ppolarization by the waveplate 54, to form the projection beam 51 during the time interval $T_2$, for projecting on a display screen (not shown) by the projection lens 52.

Figure 4:
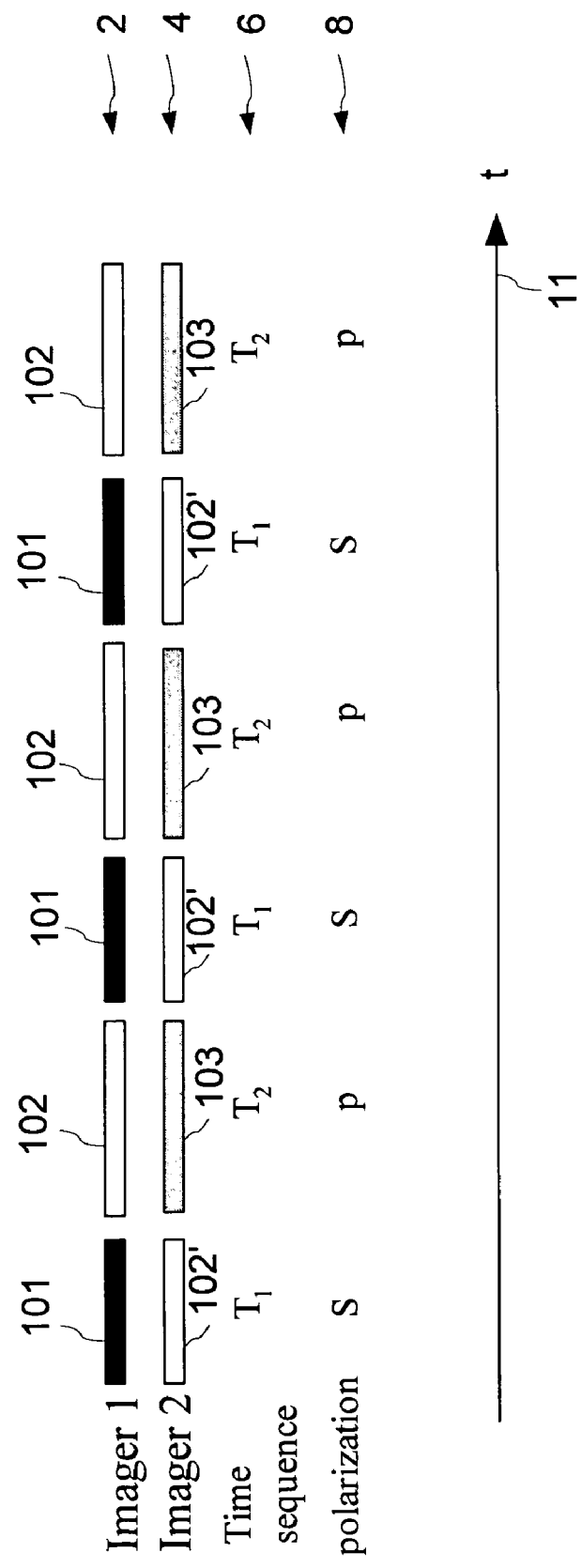
FIG. 4 is a diagram illustrating polarization switching and color sequencing scheme of the color management system shown in FIGS. 1-3.

In operation, the LC polarization switch 15 is driven to alternate between the OFF and ON states of duration $T_1$ and $T_2$ respectively, so that the color management system of the present invention alternates between the aforedescribed first and second modes of operation. The color sequencing scheme thereby provided is illustrated in FIG. 4, which summarizes the temporal operation of the aforedescribed embodiment of the invention. In this figure, a bottom-row sequence 8 shows the polarization states of the alternately polarized beam 20 in reference to a time axis 11, the top two sequences 2 and 4 show color sequencing of the first and second imagers, respectively, wherein the first color component, e.g. red, is shown with open rectangles 102, 102', the second color component, e.g. green, is shown with black rectangles 101, and the third color component, e.g. blue, is shown with dashed rectangles 103. A time sequence 6 represents durations of the corresponding color and polarization states represented by the sequences 2, 4 and 8.

As described hereinabove with reference to FIGS. 1-3 and shown in FIG. 4, in the aforedescribed embodiment of the color management system of the present invention the first and second imagers 38, 36 operate by sequentially modulating two color components each. This is accomplished by positioning the dichroic beam splitter 40 in the optical paths of the first and second colored beams 31, 32 at acute angles thereto, see e.g. FIG. 1, so that the dichroic beam splitter 40 receives the first and second colored beams 31, 32 via opposing sides 40a and 40b of the beamsplitter 40, respectively. As a result, the first imager 38 alternately modulate the first and third color components, e.g. red and blue in the shown embodiment, for outputting the first spatially modulated colored beam 39 having alternating, or time sequenced, red and blue components; this imager can be therefore referred to as a red/blue imager. Similarly, the second imager 36 alternately modulate the second and first color components, e.g. green and red in the shown embodiment, for outputting the second spatially modulated colored beam 56 having alternating, or time-sequenced, green and red components; it can be therefore referred to as a green/red imager. However, these color designations are arbitrary and can differ in other embodiments, depending on a particular choice of the first and second secondary color filters 30, 26, and the color separator 40; e.g. in an alternative embodiment one imager is a blue/green imager and the other a green/red imager; in another embodiment one imager is a blue/red imager and another is a green/blue imager; other color combinations are also possible within the scope of the current invention, with changes in the chromatic filters arrangement which would be obvious to those skilled in the art.

In yet other embodiments, one of the imagers receives the same color component during both the first and second temporal modes of operation, corresponding to the time intervals $T_1$ and $T_2$, while the other imager alternately receives the other two of the three color components. This can be accomplished, for example, by positioning the chromatic beam splitter 40 so to receive both the first and second colored beams 31, 32 via the same side thereof, suitably re-arranging their optical paths. For example, in one such embodiment the chromatic beam splitter 40 is disposed for routing the first and second color components of the first colored beam 31 towards the first 38 and second 36 imagers, respectively, and for routing the first and third color components of the second colored beam 32 towards the first 38 and second 36 imagers, respectively, so that the first imager is e.g. a red/red imager and the second imager is e.g. a green/blue imager.

Conventional color management systems that have fixed, i.e. single-color, imagers can use dichroic filters to combine the light beams from multiple imagers. In this embodiment, the imager panels 36 and 38 image, i.e. impart an image by spatially modulating, light of different colors, e.g. both imager panels image red light at different times, so the combining element, namely optical coating layer 60, works on the principle of polarization states, rather than color.

In this case, s-polarization and p-polarization is referenced to the optical coating layer 60, which is typically a stack of optical thin-film layers forming an FTIR, or MacNielle-type, polarizing beamsplitting layer, or alternatively is a high-quality metal-grid polarizer. As shown in FIG. 1, the polarizing beamsplitter cube 50 combines the spatially-modulated colored beam 56 having temporally alternating color components, e.g. green and red, from the second green/red imager 36, after it is converted to the p-polarization by the waveplate 54, with the s-polarized spatially-modulated colored beam 39 having alternating red and blue components from the red/blue imager 38, to produce a full-color projected image that is imaged by the projection lens 52 to the display screen. One way to accomplish white-point balancing is by adjusting the relative duration of the time intervals $T_1$ and $T_2$.

Importantly, the color management system of the present invention combines dynamic achromatic beam switching with static color separation and routing. This advantageous novel feature of the present invention differentiates it from other known two-panel color management systems, which typically use dynamic, either mechanical or electrical, color separating means, and obviates at least some of the drawbacks of the prior art systems. Using the electrically-controlled LC switch 15 for dynamic color sequencing of both imagers enables one to avoid any mechanically moving parts, and provides an easy way to electrically adjust the white color balance of the assembled system by changing relative durations of the $T_1$ and $T_2$ time intervals. This can be useful if performance of the light source 14 is changing over time, and enables to compensate for variation of characteristics of chromatic filters 26, 30, 40 in different systems. Furthermore, by separating the color filtering and routing functions from the dynamic switching function and employing only static color filters using standard dichroic coatings, considerably sharper transitions between different color bands can be realized, than it is typically possible using active birefringent stacks for p color-selective polarization switching.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. For example, additional chromatic and polarization filters might be used to improve performance of the aforedescribed embodiments. One example would be to use notch filters to eliminate sharp emission lines from the lamp. Another example would be to add a polarization filter, e.g. in the optical path between the imagers and the polarization combiner, to increase the contrast ratio. Of course numerous other embodiments may be envisioned without departing from the spirit and scope of the invention.

In the claims, means-plus-function clauses are intended to cover the structures described herein as performing the recited function and not only structural equivalents but also equivalent structures.

I claim:

1. A color management system comprising:
   a switching means for achromatically switching a light beam to alternate between a first path and a second path, wherein the light beam comprises first, second and third different primary color components;
   a first color separating and routing means disposed in the first path for separating off the third primary color component, and for directing the first primary color component and the second primary color component along separate paths;
   a second color separating and routing means disposed in the second path for separating off the second primary color component, and for directing the first primary color component and the third primary color component along separate paths;
   a first imager for spatially modulating at least the first primary color components, and for outputting a first spatially modulated colored beam with a single primary color component or alternating primary color components;
   a second imager for spatially modulating two of the first, second and third primary color components, and for outputting a second spatially modulated colored beam having alternating primary color components, whereby the first and second spatially modulated colored beams together include all three primary color components;
   a beam combiner for combining the first spatially modulated colored beam with the second spatially modulated colored beam to form a projection beam.

2. A color management system according to claim 1, further comprising a first polarization converter disposed in an optical path between the light source and the switching means for polarizing the light beam, wherein the switching means comprises:
   a polarization switch for achromatically switching a polarization of the light beam to alternate between first and second polarization states; and,
   a first polarizing beam splitter for directing the light beam along the first path when the light beam has the first polarization state, and for directing the light beam along the second path when the light beam has the second polarization state.

3. A color management system according to claim 2, wherein the beam combiner is a polarization beam combiner.

4. A color management system according to claim 3, further comprising a second polarization converter disposed in one of the first and second paths for converting one of the first and second polarization states into the other.

5. A color management system according to claim 1, wherein the first color separating and routing means includes a first chromatic filter for substantially removing the third primary color component from the beam of light, and for outputting a first secondary colored beam comprising first and second primary color components.

6. A color management system according to claim 5, wherein the first color separating and routing means further comprises a chromatic beam splitter disposed to receive the first secondary colored beams, for directing the first primary color component towards the first imager, and the second primary color component towards the second imager.

7. A color management system according to claim 6, wherein the second color separating and routing means includes a second chromatic filter for substantially removing the second primary color component from the beam of light, and for outputting a second secondary colored beam comprising the first and third primary color components.

8. A color management system according to claim 7, wherein the chromatic beam splitter is positioned for receiving the second colored beam, and for routing the first color component towards the second imager, and the third color component towards the first imager.

9. A color management system according to claim 7, wherein the chromatic beam splitter is positioned for receiving the second colored beam, and for routing the first color component towards the first imager, and the third color component towards the second imager.

10. A color management system according to claim 7, wherein the chromatic beam splitter comprises a static transflective dichroic beam splitter disposed in optical paths of the first and second secondary colored beams at acute angles to said optical paths.

11. A color management system according to claim 10, wherein the static transflective dichroic beam splitter is disposed for alternately receiving the first and second secondary colored beams via opposing sides thereof.

12. A color management system according to claim 1, further comprising a second polarizing beam splitter disposed to reflect the first spatially modulated colored beam toward the beam combiner, and a third polarizing beam splitter disposed to reflect the second spatially modulated colored beam toward the beam combiner.

13. A color management system according to claim 12, wherein at least one of the first, second and third polarizing beam splitters is a wire-grid polarizer.

14. A color management system according to claim 1, wherein at least one of the first and second imagers comprises a reflective imaging panel.

15. A color management system according to claim 1, wherein at least one of the first and second imagers comprises a transmissive imaging panel.

16. A color management system according to claim 1, wherein at least one of the first and second imagers comprises a liquid crystal microdisplay panel.

17. A color management system according to claim 1, wherein the first, second and third primary color components are substantially red, green and blue primary color components.

18. A color management system according to claim 1, further comprising a light source for emitting the light beam, and an output projection lens for shaping the projection beam.

19. A color management system according to claim 18, further comprising a light integrating light pipe disposed in an optical path between the light source and the switching means.

20. A color management system comprising:
   a light source for providing a polarized light beam comprising first, second and third primary color components;
   a polarization modulator for achromatically modulating the polarization of the light beam, so to output a polarization-switched light beam having a first polarization state during a first time interval $T_1$ and a second polarization state during a second time interval $T_2$;
   a polarizing beam splitter for directing polarization light beam along a first path during the first time interval $T_1$, and along a second path during the second time interval $T_2$, the polarization-switched light beam directed along the first and the second paths retaining the three primary color components;
   a first color filter disposed in the first path for separating off the third primary color components and for outputting, during the first time interval $T_1$, a first secondary colored beam comprising the first and second primary color components;
   a second color filter disposed in the second path for separating off the second primary color components and for outputting, during the second time interval $T_2$, a second secondary colored beam comprising the first and third primary color components;
   a static color separator disposed to seguentially receive the first and second secondary colored light beams, for spatially separating the first and second primary color components during the first time interval $T_1$, and the first and third primary color components during the second time interval $T_2$;
   a first and second imagers, each for receiving a different one of the first and second primary color components during the first time interval $T_1$, and a different one of the first and third primary color components during the second time interval $T_2$, and for outputting a first and second spatially modulated colored light beams, respectively, wherein at least one of the first and second spatially modulated colored light beams have time-sequenced primary color components; and,
   a beam combiner for combining the first and second spatially modulated colored beams to form a projection beam.

21. A color management system as defined in claim 20, wherein the first and second imagers receive the first and second color components, respectively, during the first time interval $T_1$, and receive the third and first color components, respectively, during the second time interval $T_2$, so that each of the first and second spatially-modulated colored beams have two time-sequenced primary color components.

* * * * *